US005979886A

United States Patent [19]

Craft et al.

[11] Patent Number: 5,979,886

[45] Date of Patent: Nov. 9, 1999

[54] RETRACT CLAMP APPARATUS

[75] Inventors: Roger L. Craft; Frederick A. Hausler, III; James V. Mascola, all of Emporia, Kans.

[73] Assignee: Vektek, Inc., Emporia, Kans.

[21] Appl. No.: 09/080,847

[22] Filed: May 18, 1998

[51] Int. Cl.[6] .......... B23Q 3/08

[52] U.S. Cl. .......... 269/24; 269/32

[58] Field of Search .......... 269/20, 22, 24, 269/27, 32, 134, 135, 136, 137, 138, 157, 160, 162, 163, 217, 229, 233, 234, 94

[56] References Cited

U.S. PATENT DOCUMENTS

| | | | |
|---|---|---|---|
| 3,578,306 | 5/1971 | Smith . | |
| 3,700,227 | 10/1972 | Sessody . | |
| 4,365,792 | 12/1982 | Johns | 269/24 |
| 4,504,046 | 3/1985 | Yonezawa | 269/24 |
| 4,509,298 | 4/1985 | Klievoneit . | |

FOREIGN PATENT DOCUMENTS

| | | |
|---|---|---|
| 3802985 | 8/1988 | Germany . |
| 509391 | 4/1976 | U.S.S.R. . |
| 933366 | 6/1982 | U.S.S.R. . |
| 1004068 | 3/1983 | U.S.S.R. . |

*Primary Examiner*—Robert C. Watson

*Attorney, Agent, or Firm*—Hovey, Williams, Timmons & Collins

[57] ABSTRACT

A retract clamp (20) utilizes three clamp arm retraction enhancement mechanisms (26, 28, 63) to increase clamp arm (24) retraction consistency. The first retraction enhancement mechanism (26) is a bifurcated piston having a first piston member (68) and a second piston member (70). If the first piston member (68) becomes tilted and caught, the second piston member (70) continues to move allowing the first piston member (68) to right itself. The second retraction enhancement mechanism (28) comprises a clamp arm guide mechanism having a base (82), a pusher (84), and a plurality of resilient members (110–124) interposed between the base (82) and the pusher (84) to bias the pusher (84) against the clamp arm (24) and align the clamp arm (24) with a clamp arm receiving area (40) defined in a clamp arm holder (22). The third clamp arm retraction enhancement mechanism comprises a lift surface (63) on the clamp arm (24). The lift surface 63 is oriented substantially perpendicular to the axis of the clamp arm (24) for upward retraction of the clamp arm outer end 54 substantially prior to axial retraction of the clamp arm (24).

5 Claims, 2 Drawing Sheets

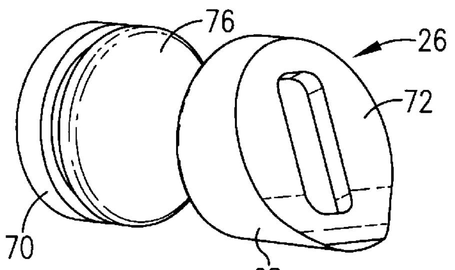
FIG. 5.
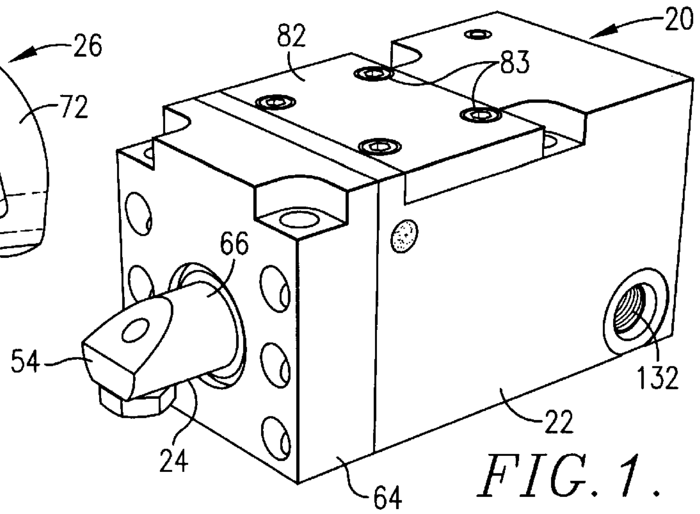
FIG. 1.
FIG. 2.
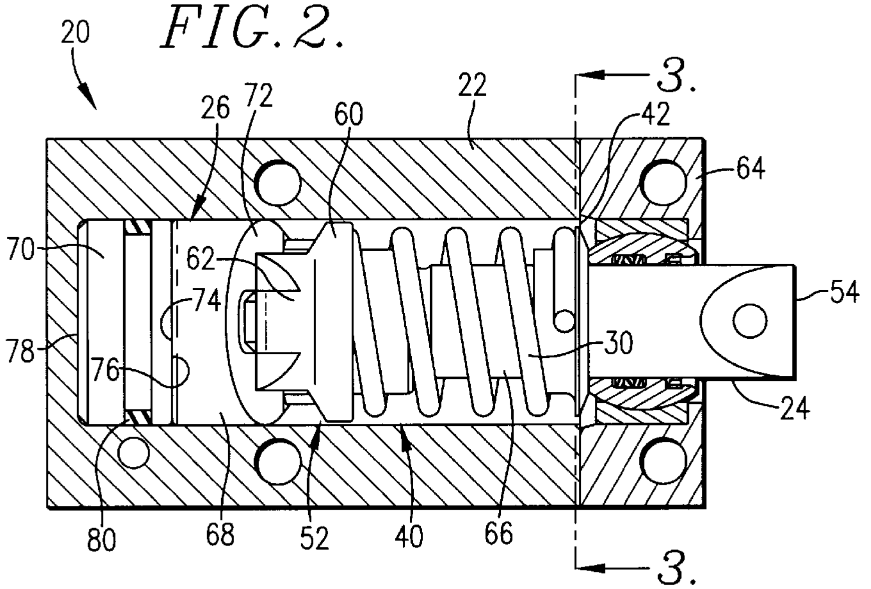
FIG. 4.
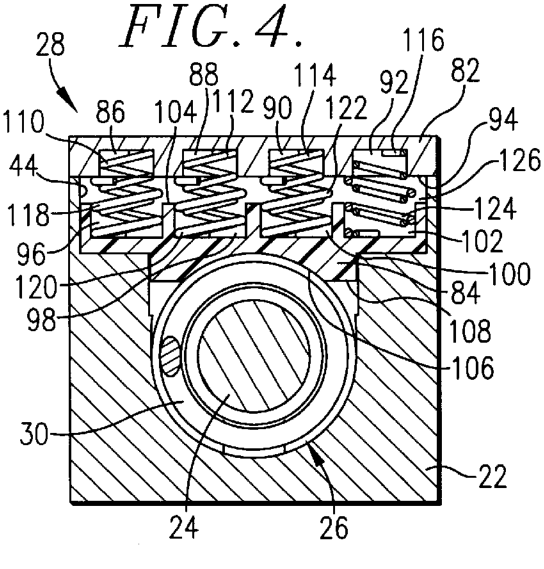
FIG. 3.
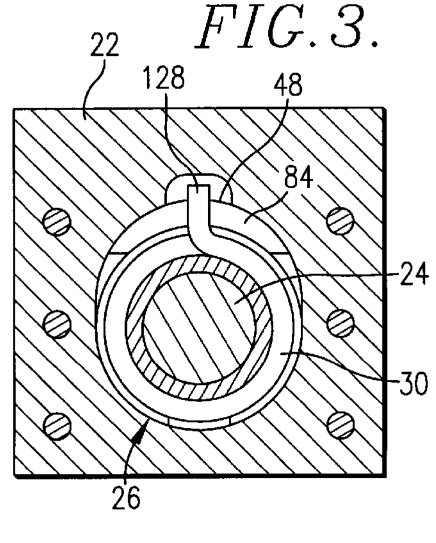

RETRACT CLAMP APPARATUS

TECHNICAL FIELD

This invention relates to work piece support devices and, more particularly, to retract clamps with longitudinally shifting clamp arms that pivot into and out of engagement with work pieces supported on fixtures.

BACKGROUND

To speed production of work pieces, such as parts for assembling machines, it is efficient to use a retract clamp to hold the parts down while some forming operation is performed on the parts by a fixture such as a mill or drill press. One such retract clamp is shown in U.S. Pat. No. 5,752,693, (currently application No. 08/705,957) which is hereby fuilly incorporated herein by reference.

One problem encountered with retract clamps in general is inconsistent retraction. Not infrequently, the clamp arm will fail to retract frilly. This is generally caused by the arm or some component of the retract clamp becoming caught in the body of the clamp. When the clamp arm fails to fully retract, it can interfere with the proper removal and placement of work pieces. It can also interfere with the proper operation of the fixture. In either case, the production operation is halted, the work piece likely ruined, and the fixture can be damaged in some significant way.

Another problem encountered with retract clamps is seal failure. In a hydraulic retract clamp, a piston member is provided with a seal to contain hydraulic fluid in a hydraulic chamber. During normal operation, the piston member can tilt. When the piston member tilts, it pinches the seal. Over time the seal fails allowing hydraulic fluid to leak out of the hydraulic chamber eventually rendering the clamp inoperable.

The retract direction of the clamp arm in retract clamps is also generally problematic. If the retract clamp pulls the clamp arm rearwardly before the clamp arm moves upwardly and disengages the work piece, the clamp arm drags across the work piece which can leave marks on the work piece. Further, the clamp arm can move the work piece as it retracts. This moves the work piece out of position which can require that the production operation be halted.

SUMMARY OF THE INVENTION

Accordingly, one object of the present invention is to provide an improved retract clamp which fully retracts the clamp arm with increased consistency.

Another object of the present invention is to provide an improved retract clamp which operates in a manner to extend seal life.

It is still another object of the present invention to provide an improved retract clamp which substantially disengages a held work piece prior to axial retraction of the clamp arm.

In carrying out the foregoing and other objects, the present invention contemplates an improved retract clamp for engaging a work piece supported on a fixture. The retract clamp includes an elongated pivoting clamp arm slidably received in a clamp arm holder. A movement mechanism is operatively coupled with the clamp arm to move the clamp arm between retracted and extended positions. A clamp arm retraction enhancement mechanism is operatively positioned relative to the clamp arm to guide the clamp arm as it moves from the extended position to the retracted position.

In a preferred embodiment, the retraction enhancement mechanism includes a pivot allowance member allowing the clamp arm to pivot as it moves to the extended position. In one embodiment the pivot allowance member comprises an inclined surface engaging an inner end of the clamp arm. In another embodiment the pivot allowance member comprises a resilient member operatively engaging the clamp arm to push the clamp arm into alignment with a clamp arm receiving area of the holder.

In another preferred embodiment, the retraction enhancement mechanism comprises a bifurcated piston having a first piston member engaging the clamp arm and a second piston member engaging the movement mechanism. If the clamp arm causes the first piston member to tilt, the second piston member continues to retract allowing the first member to restart its retraction. The second piston member is provided with a seal, and because the second piston member does not tilt, the life of the seal is extended.

In still another preferred embodiment, the retraction enhancement mechanism comprises a clamp arm guide mechanism having a base attached to the clamp holder, a clamp arm pusher, and a plurality of resilient members interposed between the holder and the pressure. The pusher engages the clamp arm, and the resilient members force the clamp arm into alignment with the clamp arm receiving area.

In a further preferred embodiment, the movement mechanism comprises a biasing member. The biasing member has an outwardly protruding leg which engages the clamp holder to bias the clamp arm into alignment with the clamp arm receiving area.

A third retraction enhancement mechanism having a lift surface substantially perpendicular to an axis of the clamp arm operates to raise the clamp arm upwardly substantially before the clamp arm begins to retract axially. The lift surface is also substantially perpendicular to the axis of the internal cavity when the clamp arm is aligned with the internal cavity.

BRIEF DESCRIPTION OF THE DRAWINGS

FIG. 1 is a perspective view of a retract clamp according to the present invention;

FIG. 2 is a horizontal cross-sectional view of the retract clamp of FIG. 1;

FIG. 3 is a transverse vertical cross-sectional view of the retract clamp of FIG. 1 taken along line 3—3 in FIG. 2;

FIG. 4 is a transverse vertical cross-sectional view of the retract clamp of FIG. 1 taken along line 4—4 of FIG. 6;

FIG. 5 is a perspective view of a clamp arm retraction enhancement mechanism according to the present invention;

DETAILED DESCRIPTION

Figure 6:
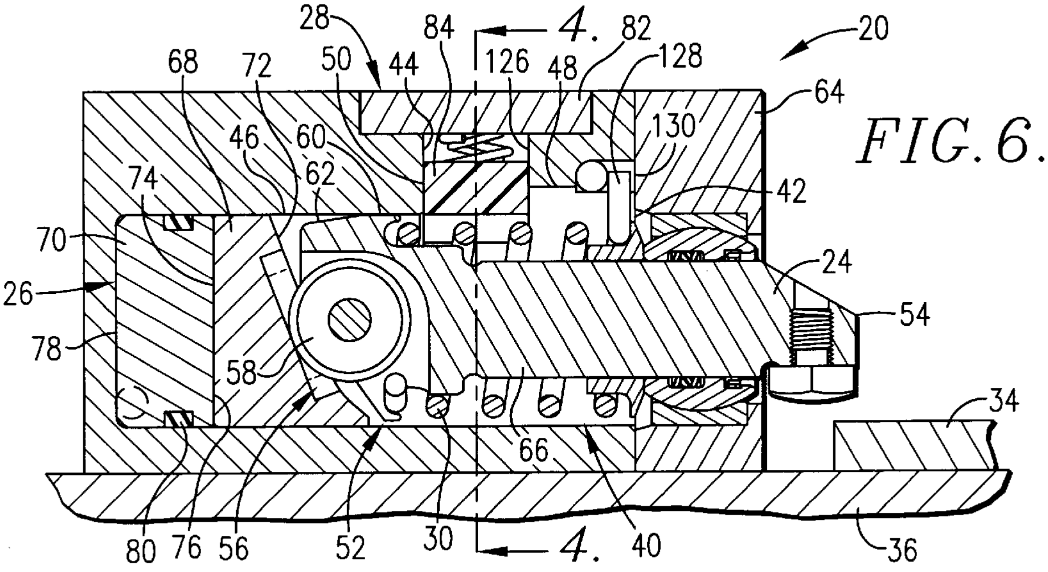
FIG. 6 is longitudinal vertical cross-sectional view of the retract clamp of FIG. 1 in a retracted position.
Figure 7:
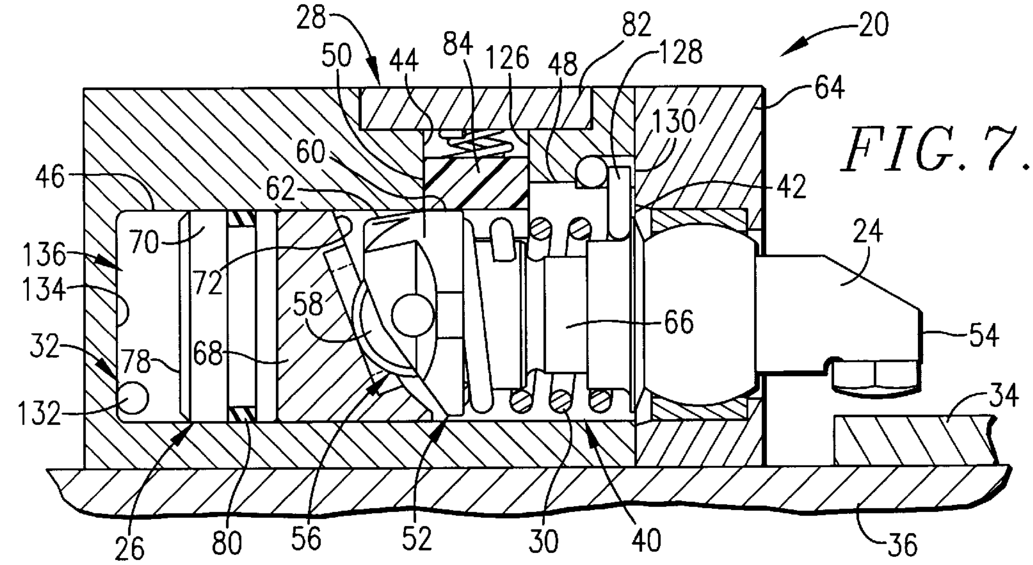
FIG. 7 is longitudinal vertical cross-sectional view of the retract clamp of FIG. 1 in a partially extended position.

Referring to the drawings in greater detail, the retract clamp 20 shown in FIGS. 1 and 7 includes a clamp arm holder 22, a pivotable clamp arm 24, two clamp arm retraction enhancement mechanisms 26, 28 supported by the holder, and two movement mechanisms 30, 32. The arm 24 is slidably received in the arm holder 22 and is shiftable between retracted (FIG. 6) and extended (FIG. 8) positions by the movement mechanisms 30, 32 respectively to engage and hold a work piece 34 on a support surface 36 of a fixture while a forming operation is performed on the work piece 34 by the fixture. After the forming operation is complete, the arm 24 is retracted to release the work piece 34. The general components and operations of the retract clamp are fully disclosed in U.S. Pat. No. 5,752,693, (currently application No. 08/705,957) which is hereby fully incorporated herein by reference, and will not be discussed beyond the extent necessary for a complete understanding of the present invention.

Referring to FIGS. 1, 2, and 6, the clamp arm holder 22 preferably comprises a rectangular body defining an elongated internal cavity 40 which provides an elongated clamp arm receiving area into which the clamp arm is slidably received. The holder also has an arm opening 42 and a top opening 44. The holder is preferably mounted on the support surface 36 relative to the fixture, so that it is operative to hold the work piece. The internal cavity has a small diameter portion 46 opposite the arm opening 42 and a large portion 48, forming a circumferential extending recess, adjacent the arm opening and the top opening. Thus, a ledge 50 is formed at the transition between the small portion and the large portion. It is on this ledge 50 where the clamp arm of prior devices has a tendency to catch preventing consistent complete retraction.

The elongated clamp arm 24 has an inner end 52, an outer clamp end 54, and a longitudinal axis. The inner end 52 is slidably received in the clamp arm receiving area 40 and has a roller assembly 56 with a roller 58 attached thereto. The top surface 60 of the roller assembly 56 has an angled portion 62 that comprises a decline of approximately 10° relative to the rest of the top surface 60. The roller assembly also includes a rearward lift surface 63 adjacent the angled portion 62 of the top surface 60. The lift surface 63 and the angled portion 62 are joined by a rounded corner 65. The lift surface 63 is substantially perpendicular to the longitudinal axis of the internal cavity when the clamp arm is retracted. The outer end 54 extends through the arm opening 42 and is held in place by a pivotal arm mount 64, which forms part of the arm holder 22. A preferably cylindrical arm shaft 66 of the clamp arm extends between the inner and outer ends of the arm and slides in the arm mount 64.

Referring to FIGS. 2, 5, and 6, the first retraction enhancement mechanism 26 is operatively positioned relative to the clamp arm 24 and comprises a bifurcated piston having a first piston member 68 and a second piston member 70. The first piston member 68 is a cylindrical cam piston and includes a front inclined surface 72, inclined relative to the axis of the clamp arm, forming a pivot inducing member which engages the roller. The inclined surface 72 causes the roller to roll up the surface, so that the arm pivots in its extended position. The cam piston is slidably received in the small portion 46 and also has a rear surface 74 for perpendicular to the axis of the clamp arm engaging the second piston member 70.

The second piston member 70 is a cylindrical pressure piston and includes a front piston surface 76 perpendicular to the clamp arm axis contacting the rear surface 74 of the cam piston 68 and a rear actuating surface 78 also perpendicular to the clamp arm axis. The pressure piston is sufficiently long to substantially prevent it from tilting and catching. A seal ring 80 extends around the circumference of the cylindrical pressure piston to prevent fluid of the movement mechanism 32 from leaking into the remainder of the retract clamp. Because the pressure piston does not tilt, the seal is not pinched or otherwise damaged thereby extending the operable life of the seal.

Referring to FIGS. 4 and 7, the second retraction enhancement mechanism 28 comprises a clamp arm guide mechanism juxtaposed the clamp arm receiving area 40. The clamp arm guide mechanism has a base 82 fixedly attached to the holder 22 with conventional fasteners 83 (FIG. 1) over the top opening 44. A clamp arm pusher 84 engages the clamp arm at the top surface 60 of the roller assembly 56, and a plurality of resilient members 110–124 extend between the base 82 and the pusher 84 to guide and force the clamp arm axis into alignment with the clamp arm receiving area.

The base 82 is generally flat and includes four recesses 86, 88, 90, 92 formed on its inner surface 94. The pusher 84 includes four opposed recesses 96, 98, 100, 102 in its top surface 104. The pusher also includes an arc 106 in its bottom surface 108 for engaging the top surface 60 of the roller assembly. The resilient members preferably comprise four long springs 110, 112, 114, 116 extend between the opposed apertures and are received in the recesses 86–92, 96–102 of both the base 82 and the pusher 84. The resilient members preferably further comprise four short springs 118, 120, 122, 124 which also extend between the opposed recesses. The short springs are received in the recesses 96–102 of the pusher and engage the inner surface 94 of the base 82. The short springs have a larger wire diameter than the long springs, and the short springs extend through the center cavities of the long springs. The pusher is slidably received in a slot 126 in the holder 22 formed at the top opening 44 and is biased by the springs into engagement with the clamp arm to guide the clamp arm into alignment with the clamp arm receiving area and to the retracted position. Thus, the pusher operates as a pivot inducement member inducing the clamp arm to pivot into alignment with the clamp arm receiving area 40.

Figure 8:
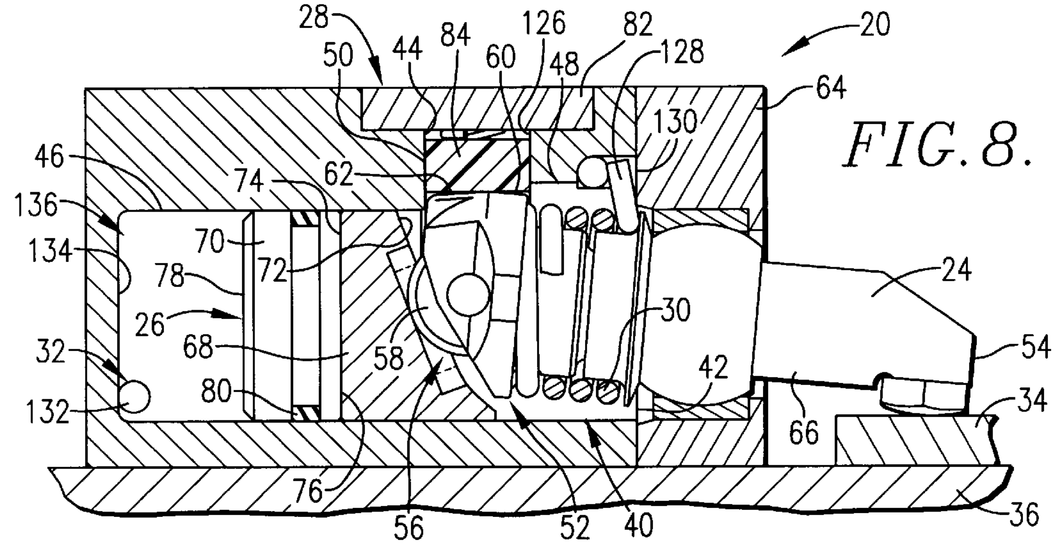
FIG. 8 is longitudinal vertical cross-sectional view of the retract clamp of FIG. 1 in a fully extended position.

Referring to FIGS. 3 and 8, the first movement mechanism 30 is operatively coupled with the clamp arm and comprises a biasing member, preferably a spring, surrounding the shaft 66 of the clamp arm 24. The biasing member operates to force the clamp arm to its retracted position. The biasing member also includes an upwardly protruding leg 128 which engages the arm mount 64 of the holder to bias the arm into alignment with the clamp arm receiving area 40. As the arm is fully extended the leg 128 contacts the inner face 130 of the arm mount 64 bending the leg away from the arm mount 64.

Referring to FIG. 8, the second movement mechanism 32 comprises hydraulic fluid fed to the retract clamp through a port 132 into a hydraulic chamber 136 defined in the small diameter portion 46 by the actuating surface 78 of the second piston member 70 and a rear wall 134 of the internal cavity 40. The hydraulic pressure engages the actuating surface 78 of the second piston 70 and forces the second piston away from the internal rear wall of the internal cavity 40.

In operation and with reference to FIGS. 6–8, hydraulic fluid is fed into the retract clamp 20 through the port 132 and pushes the pressure piston 70 against the cam piston 68. The cam piston engages the roller 58 of the clamp arm 24, and as the hydraulic fluid forces the arm toward the axially extended position, the top surface 60 moves past the ledge 50, and the inclined surface 72 causes the arm to begin to pivot into the position shown in FIG. 8 as permitted by the angled portion 62 of the top surface 60 of the roller assembly. When the lift surface 63 passes the ledge 50, the clamp arm finishes the pivot motion with the lift surface 63 engaging the ledge 50 and the roller assembly moving into the slot 126. During extension, the lift surface 63 causes the outer end 54 of the clamp arm to move downwardly. Because the lift surface is substantially perpendicular to the axis of the clamp arm and the internal cavity, the outer end moves downwardly with very little movement axially. In the extended position the springs 110–124 are compressed and the pusher 84 is forced upwardly in the slot 126.

When the work piece 34 is to be released, hydraulic fluid is withdrawn through the port 132 and the pistons slide toward the rear wall 134. The springs force the pusher and hence the roller assembly of the arm downwardly until the arm is aligned with the clamp arm receiving area and the inclined surface 62 slides past the ledge 50. Again, the perpendicular orientation of the lift surface 63 causes the outer end to lift upwardly with substantially no movement axially. Thus, the outer end disengages the work piece before the clamp arm retracts axially. The rounded corner provides a smooth transition over the ledge 50 between the lift surface 63 and the angled portion 62 of the roller assembly 56. Therefore, the perpendicular lift surface provides a third clamp arm retraction enhancement mechanism.

The piston members then continue to guide the clamp arm by sliding toward the rear surface, and if the cam piston 68 should tilt causing it to catch in the small portion 46 of the internal cavity, the pressure piston does not tilt and continues to move creating a zero pressure condition against the cam piston and allowing the cam piston to right itself and continue moving toward the rear surface of the internal cavity. Thus, the retract clamp of the present invention provides two clamp arm retraction enhancement mechanisms which increase the consistency of clamp arm retraction, leading to increased production rates and reduced scrap. Additionally, the leg 128 of the biasing member tends to force the inner end of the clamp arm downwardly, so that the clamp arm axis goes into alignment with the clamp arm receiving area.

Although preferred forms of the invention have been described above, it is to be recognized that such disclosure is by way of illustration only, and should not be utilized in a limiting sense in interpreting the scope of the present invention. Modifications to the exemplary embodiments, as herein above set forth, could be readily made by those skilled in the art without departing from the spirit of the appended claims.

The inventors hereby state their intent to rely on the Doctrine of Equivalents to determine and assess the reasonably fair scope of their invention as pertains to any apparatus or method not materially departing from but outside the literal scope of the invention as set out in the following claims.

We claim:

1. A retract clamp for engaging a work piece supported on a fixture, the retract clamp comprising:

an elongated and pivotable clamp arm including an inner end and an outer clamp end for engaging the work piece, the clamp arm having an axis, the clamp arm being shiftable between a retracted position and an extended position in which the clamp arm is pivoted and axially extended;

a clamp arm holder for mounting relative to the fixture, the clamp arm holder defining an elongated clamp arm receiving area slidably receiving the inner end of the clamp arm therein;

a clamp arm retraction enhancement mechanism operatively positioned relative to the clamp arm, the retraction enhancement mechanism operating to guide the clamp arm as it pivots and moves from the extended position to the retracted position, the retraction enhancement mechanism comprising a clamp arm guide mechanism juxtaposed the clamp arm and contacting the clamp arm to guide the clamp arm during retraction, the clamp arm guide mechanism comprising a pusher and a plurality of springs biasing the pusher into engagement with the clamp arm to guide the clamp arm to the retracted position; and a movement mechanism operatively coupled with the clamp arm to move the clamp arm between its retracted and extended position.

2. A retract clamp for engaging a work piece supported on a fixture, the retract clamp comprising:

an elongated and pivotable clamp arm including an inner end and an outer clamp end for engaging the work piece, the clamp arm having an axis, the clamp arm being shiftable between a retracted position and an extended position in which the clamp arm is pivoted and axially extended;

a clamp arm holder for mounting relative to the fixture, the clamp arm holder defining an elongated clamp arm receiving area slidably receiving the inner end of the clamp arm therein;

a clamp arm retraction enhancement mechanism operatively positioned relative to the clamp arm, the retraction enhancement mechanism operating to guide the clamp arm as it pivots and moves from the extended position to the retracted position, said clamp arm retraction enhancement mechanism comprising a lift surface on the clamp arm and the lift surface being substantially perpendicular to the axis of the clamp arm for retracting the clamp arm upwardly substantially before axial retraction of the clamp arm; and a movement mechanism operatively coupled with the clamp arm to move the clamp arm between its retracted and extended position.

3. A retract clamp for engaging a work piece supported on a fixture, the retract clamp comprising:

an elongated clamp arm including an inner end and a clamp end for engaging the work piece, and the clamp arm having an axis, a retracted position, and an extended position;

a clamp arm holder for mounting relative to the fixture, and the clamp arm holder defining a clamp arm receiving area having a length and slidably receiving the inner end of the clamp arm therein;

a first piston member held in the clamp arm receiving area, and the first piston member having an arm engaging front surface engaging the inner end of the arm and a rear surface opposite the front surface, said arm engaging front face of the first piston member being inclined relative to the axis of the clamp arm to pivot the arm when the arm is in the extended position;

a second piston member held in the clamp arm receiving area, and the second piston member having a front piston surface contacting the rear surface of the first piston member and a rear actuating surface; and a movement mechanism operatively coupled with the clamp arm to move the clamp arm between its retracted and extended position.

4. A retract clamp for engaging a work piece supported on a fixture, the retract clamp comprising:

an elongated clamp arm including an inner end and a clamp end for engaging the work piece, and the clamp arm having a retracted position and an extended position;

a clamp arm holder for mounting relative to the fixture, and the clamp arm holder defining a clamp arm receiving area slidably receiving the inner end of the clamp arm therein;

a clamp arm guide mechanism juxtaposed the clamp arm receiving area, and the clamp arm guide mechanism engaging the clamp arm to guide the clamp arm during retraction, the clamp arm guide mechanism comprising a base attached to the clamp arm holder, a clamp arm pusher engaging the clamp arm, a plurality of resilient members extending between the base and the pusher, and the plurality of resilient members forcing the clamp arm into alignment with the clamp arm receiving area; and a movement mechanism operatively coupled with the clamp arm to move the clamp arm between its retracted and extended position.

5. The retract clamp according to claim 4, wherein the base and the pusher define a plurality of opposed recesses having the resilient members received therein.

* * * * *